United States Patent [19]

Miller

[11] 3,727,717
[45] Apr. 17, 1973

[54] AIR COUPLED SEISMIC ENERGY GENERATOR
[75] Inventor: Dale E. Miller, Ponca City, Okla.
[73] Assignee: Continental Oil Company, Ponca City, Okla.
[22] Filed: Aug. 24, 1971
[21] Appl. No.: 174,343

[52] U.S. Cl.......181/0.5 VM, 181/0.5 EC, 181/0.5 H
[51] Int. Cl. .............................................G01v 1/02
[58] Field of Search ......................181/.5 VM, .5 EC, 181/.5 H

[56] References Cited
UNITED STATES PATENTS
3,547,218  12/1970  Hamilton .........................181/.5 VM

OTHER PUBLICATIONS

B. Geophysics "Soft Touch" p. A-76, June 1970
C. R "New Offshore Seismic Energy Source Creates Implosion," Reprint from World Oil, Sept. 1967, Gulf Publishing Co.

Primary Examiner—Benjamin A. Borchelt
Assistant Examiner—R. Kinberg
Attorney—Joseph C. Kotarski et al.

[57] ABSTRACT

An improved seicmic energy generator wherein pressurized air is supplied between a base plate and the earth's surface to form an air cushion therebetween, and the base plate is driven vertically upwardly and downwardly to generate and transmit a seismic force to the earth's surface via the air cushion.

12 Claims, 3 Drawing Figures

PATENTED APR 17 1973  3,727,717

INVENTOR
DALE E. MILLER

BY William J. Miller
ATTORNEY

AIR COUPLED SEISMIC ENERGY GENERATOR

BACKGROUND OF THE INVENTION

1. Field of the Invention

This invention relates generally to seismic energy generators and, more particularly, but not by way of limitation, to an improved seismic energy generator for coupling a force to an earth surface via an air cushion.

2. Brief Description of the Prior Art

In the past there have been various devices constructed for producing a vibrational energy input into the earth, commonly referred to as "vibrators," which were utilized for seismic prospecting, the method and apparatus being described in the U.S. Pat. No. 2,668,128 issued to Doty et al. Some vibrators have been constructed for generating seismic waves within a water medium such a described in the U.S. Pat. No. 3,482,648, issued to G. L. Brown et al, for example; and there have also been vibrators constructed for utilization in a swampy or marshland type of area such as described in the U.S. Pat. No. 3,365,019, issued to M. G. Bays, for example (the Doty, the Brown, and the Bays patents each being assigned to the assignee od the present invention). A seismic vibrator design has recently been suggested wherein air was supplied to a plenum chamber of an air cushion vehicle through an air modulating apparatus, the plenum chamber and the air modulating apparatus being constructed to create a modulated pressure wave which was applied to the earth surface.

SUMMARY OF THE INVENTION

The present invention provides a seismic energy generating apparatus, having an air source for supplying pressurized air generally between a base plate and an earth surface, and a displacement apparatus for driving the base plate in a vertical direction to generate and transmit a force to the earth surface via the air cushion between the base plate and the earth surface.

An object of the invention is to provide a seismic energy generating apparatus particularly useful over a soft or irregular earth surface which is economical in constructioan and operation.

Another object of the invention is to provide a more efficient and economical apparatus for coupling a force to an earth surface via an air cushion.

Other objects and advantages will be evident to those skilled in the art from the following detailed description when read in conjunction with the accompanying drawings which illustrate the various embodiments of the invention.

DESCRIPTION OF THE PREFERRED EMBODIMENT

Figure 1:
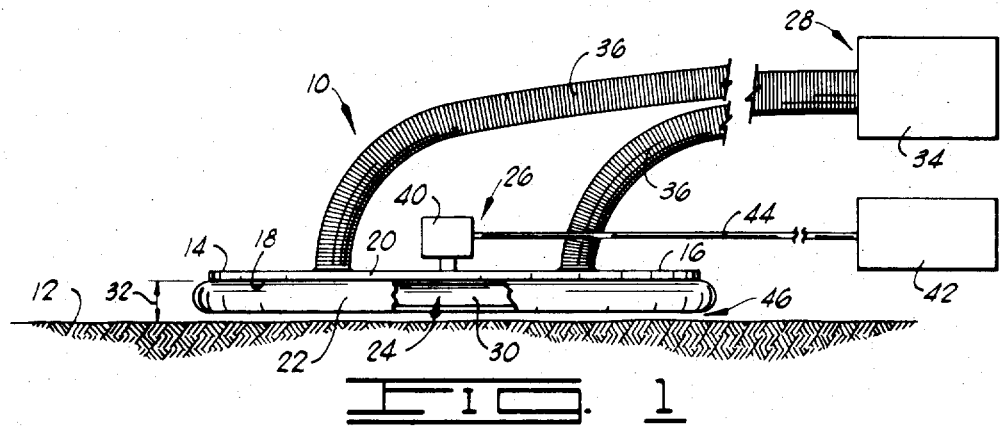
FIG. 1 is a side elevational view of a seismic energy generating apparatus.
Figure 2:
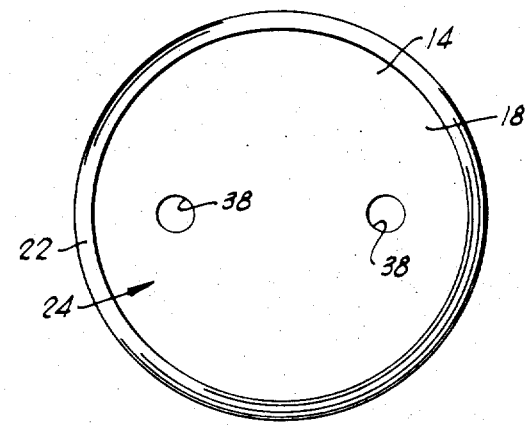
FIG. 2 is a bottom, plan view showing the base and the skirt of the apparatus of FIG. 1.

Referring to the drawings in general, and to FIGS. 1 and 2 in particular, shown therein is a seismic energy generating apparatus 10, which is constructed to generate, transmit and couple seismic forces to an earth surface 12, and generally includes: a base 14, having an upper side 16, a lower side 18 and an outer periphery 20; a skirt 22, which is connected about a portion of the lower side 18 of the base 14 to form with the base 14 and the underlying earth surface 12 a plenum chamber 24; a displacement assembly 26, having a portion connected to the base 14; and an air source assembly 28, which is connected to the apparatus 10 to supply pressurized air generally between the base 14 and the earth surface 12 or, in other words, generally within the plenum chamber 24 to form an air cushion 30. In general, the base 14 is supported a distance 32 above the earth surface 12 via the air cushion 30, and is driven in a generally vertical direction by the displacement assembly 26 in such a manner that the base 14 acts upon the air cushion 30 to generate a force which is transmitted to the earth surface 12, the force being coupled to the earth surface 12 via the air cushion 30. Although the apparatus 10 is constructed to provide a seismic energy generating source which can be efficiently and effectively utilized in swampy, muddy, rocky, water and marshy type of terrains, the apparatus 10 also provides a seismic energy source which can be effectively and efficiently utilized over other types of terrain, the term "earth surface" being utilized above and below to generally designate the surface of any such terrain.

The base 14 is, in a preferred form, constructed of a relatively rigid, light weight material to substantially reduce the degree of flexing thereof and to optimally maximize the verticql displacement thereof resulting from a particular force being applied thereto via the displacement assembly 26, during the operation of the apparatus 10. The air source assembly 28 includes an air source 34 constructed to supply air at a predetermined pressure level and at a predetermined flow rate to form the required air cushion 30 for supporting the base 14 above the earth surface 12 a distance 32. The air source 34 is connected to the base 14 via a pair of flexible ducts 36, each duct 36 being connected about an air opening 38 formed through the base 14, the air source 34, more particularly, supplying pressurized air between the base 14 and the earth surface 12 via the ducts 36 and the air openings 38.

In one form, the pressure level and the flow rate of the air being supplied through each of the ducts 36 is separately controlled, and, in one other form, each of the ducts 36 is an extension of a main duct supplied by the common air source 34. The precise number of air openings 38, interconnecting ducts 36 and the spacial disposition of such on the base 14 may be varied for particular applications, the details of any particular design being determined to uniformly distribute the pressurized air forming the air cushion 30.

The displacement assembly 26 includes a vibrator 40 connected to the upper side 16 of the base 14, a vibrator power supply 42, and an interconnecting cable 44, the cable 44 being, more particularly, a hose type connection in those instances wherein the vibrator 40 is of the hydraulic type. The vibrator 40 is drivingly connected to the base 14 to impart vertical displacement thereto, in an acuated position thereof. In one form, the vibrator 40 and the vibrator power supply 42 are constructed to impart a momentary, impact type of force to vertically displace the base 14 a predetermined distance, and, in one other form, to impart an oscillating type of force to vertically displace the base 14 a predetermined distance at predetermined time intervals, for example. The vibrator 40 may be any one of the known types of seismic energy transducers, i.e. hydraulic, pneumatic, electro-mechanical, electromagnetic, mechanical, for example, the basic consideration being that the vibrator 40 imparts vertical movement to the base 14 in a manner controlled by the vibrator power supply 42 when actuated thereby.

In a preferred form, the skirt 22 extends a distance downwardly from the base 14 toward the earth surface 12, and is constructed of a relatively flexible material so that the skirt 22 is not destructively contacted by portions of the earth surface 12 during the operation of the apparatus 10. The skirt 22 reduces the leakage of air from the plenum chamber 24 and thereby cooperates to maintain the air cushion 30; although, in one form, the skirt 22 can be eliminated and the air source assembly 28 sized to provide a sufficient additional flow of pressurized air to compensate for any increased leakage of air.

During the operation of the seismic energy generating apparatus 10, the pressurized air is injected into the plenum chamber 24 from the air source 34 at a sufficient pressure level and at a sufficient flow rate to form an air cushion 30 which supports the base 14 and the apparatus disposed thereon a distance 32 above the earth surface 12, and to compensate for the leakage of air generally through an air gap 46 between the skirt 22 and the earth surface 12. The amount of seismic energy generated by the apparatus 10 is related to the fractional change of the volume of air and the resulting pressure level change of the air forming the air cushion 30 as the base 14 is displaced a given vertical distance via the displacement assembly 26. It should also be noted that, as the distance 32 is increased or, in other words, as the thickness of the air cushion 30 is increased, a greater vertical displacement of the base 14 will be required to generate a given pressure level change and transmit a given seismic force to the earth surface 12. Also, since the seismic force to be applied to the earth surface 12 is related to the product of the pressure level change of the air cushion 30 and the area of air cushion 30, the area of the air cushion 30 and consequently the area of the base 14 must be increased proportionally to apply a greater seismic force, assuming a constant pressure level change of the air cushion 30. The foregoing general relationships, along with other design considerations, such as cost, ease of construction, and mounting of other equipment, generatlly determine the particular size, shape and material of construction for the base 14. In a preferred form, however, the area of the portion of the base 14 forming the air cushion 30 is sufficiently large to support the static weight of the apparatus 10 with a given static pressure level of the air cushion 30.

Figure 3:
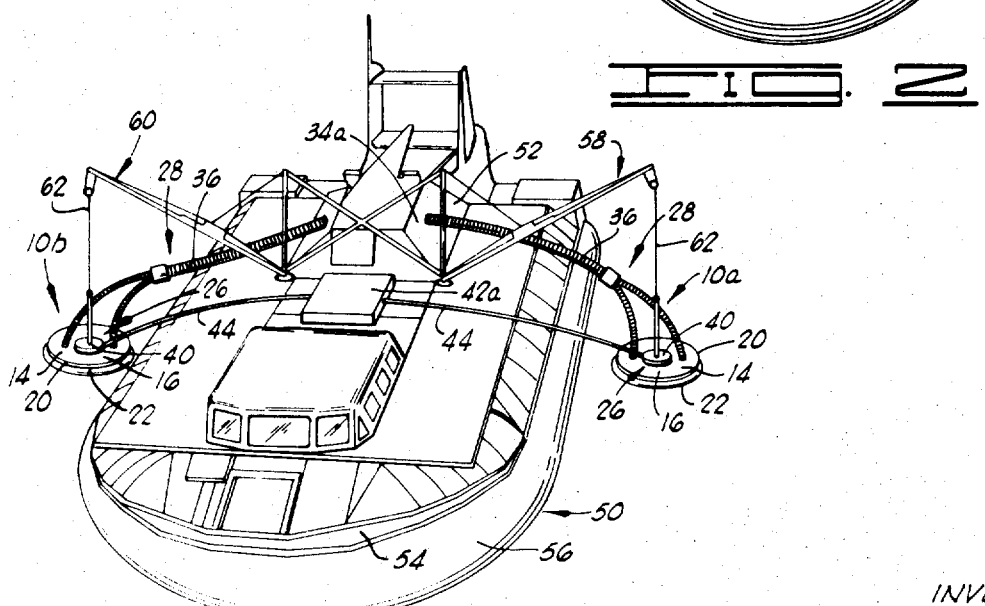
FIG. 3 is a perspective view showing the apparatus of FIG. 1 supported on an air cushion, support vehicle.

In one form, the air source 34 and the vibrator power source 42 can be supported on the base 14, and, in one other form, the air source 34 and the vibrator power source 42 are supported on a separate support vehicle, which also provides the primary motive power for pulling and positioning one or more of the apparatus 10. In this latter-mentioned form of the invention, the design of the apparatus 10 does not have to be compromised to support the additional weight of the air source 34 and the vibrator power source 42. One embodiment of such a support vehicle is diagrammatically shown in FIG. 3 and designated by the reference numeral 50.

The support vehicle 50 is of an air cushion type of vehicle, and includes: a main air supply 52, which is typically an air compressor or blower, for supplying pressurized air within a plenum chamber (not shown) formed by a base 54 and surrounding skirt 56, the pressurized air within the plenum chamber supporting the support vehicle 50 generally upon an air cushion. A pair of seismic energy generating apparatus 10a and 10b are supported on the support vehicle 50 via a boom assembly 58 and 60, respectively, each boom assembly 58 and 60 being movably supported on the support vehicle 50 and extending generally over one side of the support vehicle 50. More particularly, each apparatus 10a and 10b is supported on the end of a cable 62 of one of the boom assemblies 58 and 60, the boom assemblies 58 and 60 being constructed for moving and positioning each of the apparatus 10a and 10b at predetermined positions generally over the earth surface. The apparatus 10a and 10b are constructed substantially the same as the apparatus 10, described in detail above, the designations 10a and 10b being utilized for the purpose of clarity.

In this embodiment, the main air supply 52 also provides the pressurized air for the air source 34a of the apparatus 10, the air supplies and the vibrator power source 42a is disposed and supported on the support vehicle 50. Although the support vehicle 50 has been shown supporting two of the apparatus 10 (10a and 10b), in a particular application, more or less of the apparatus 10 can be supported from a support vehicle, the two being shown for the purpose of description only.

The seismic energy generating apparatus, described in detail before, thus, provides an economical and efficient means for producing seismic energy and coupling such energy to the earth via an air cushion which is useful over virtually any type of terrain, that is, soft earth surface or concrete or hard packed type of an earth surface. The seismic energy produced via the apparatus can be of the impact type or of the oscillating type, depending upon the desirability in a particular application.

Changes may be made in the construction and the operation of the various components or the elements described herein without departing from the spirit and the scope of the invention as defined in the following claims.

What is claimed is:

1. A seismic energy generating apparatus for transmitting a force to an earth surface, comprising:
   base means;
   air source means supplying pressurized air generally between the base means and the earth surface; and
   displacement means connected to the base means for moving the base means in a generally vertical direction to transmit a force to the earth surface via the air between the base means and the earth surface.

2. The apparatus of claim 1 wherein the base means has an upper side, a lower side and an outer preiphery; and wherein the apparatus in defined further to include:

a skirt means connected to the lower side of the base means and extending a distance downwardly therefrom, the skirt means encompassing a portion of the lower side of the base means and forming therewith a plenum chamber, the skirt means reducing the leakage of the pressurized air.

3. The apparatus of caim 2 wherein the skirt means is constructed of a relatively flexible material.

4. The apparatus of claim 1 wherein the base means is generally circular shaped.

5. The apparatus of claim 1 wherein the displacement means is defined further to include:

a vibrator connected to the base means for imparting vertical displacement thereto in an actuated position thereof; and vibrator power source means connected to the vibrator to actuate the vibrator in one position thereof.

6. The apparatus of claim 1 wherein the displacement means imparts a momentary, impact type of force vertically displacing tee base means a predetermined distance.

7. The apparatus of claim 1 wherein the displacement means imparts an oscillating type of force vertically displacing the base means a predetermined distance at predetermined time intervals.

8. The apparatus of claim 1 wherein the air source means supplies pressurized air at a predetermined flow rate and at a predetermined pressure level to provide an air cushion for supporting the base means a predetermined distance generally above the earth surface.

9. The apparatus of claim 1 wherein the base means includes an air opening means; and wherein the air source means is connected to the base means via a flexible duct means, the air source means supplying pressurized air between the base means and the earth surface via the flexible duct means and the air opening means.

10. The apparatus of claim 1 defined further to include:

support means for supporting the base means in
predetermined positions, comprising: support vehicle means having a portion thereof forming a plenum chamber;

main air supply means for supplying pressurized air generally within the plenum chamber of the support vehicle means; and boom means connected to the support vehicle means and to the base means for moving and positioning the base means at predetermined positions over the earth surface.

11. The apparatus of claim 10 wherein a portion of the displacement means and a portion of the air source means are each supported on the support vehicle means.

12. The apparatus of claim 1 wherein the displacement means and the air source means are each supported on a portion of the base means.

* * * * *